(12) United States Patent
Schaffer

(10) Patent No.: US 6,336,529 B1
(45) Date of Patent: Jan. 8, 2002

(54) ELECTROMECHANICAL BRAKE FOR MOTOR VEHICLES

(75) Inventor: Wolfram Schaffer, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,454

(22) PCT Filed: Nov. 11, 1998

(86) PCT No.: PCT/DE98/03290

§ 371 Date: Jul. 7, 2000

§ 102(e) Date: Jul. 7, 2000

(87) PCT Pub. No.: WO99/25988

PCT Pub. Date: May 27, 1999

(30) Foreign Application Priority Data

Nov. 13, 1997 (DE) .......................................... 197 50 274

(51) Int. Cl.⁷ .............................................. F16D 65/36
(52) U.S. Cl. ..................................... 188/156; 188/71.9
(58) Field of Search .............................. 188/71.1, 71.2, 188/71.9, 72.1, 72.3, 156, 157, 158, 159, 160, 161, 162, 163, 171, 173

(56) References Cited

U.S. PATENT DOCUMENTS

| 3,896,907 A | * | 7/1975 | Baxendale | 188/72.1 |
| 4,976,800 A | * | 12/1990 | Edwards | 188/251 A |
| 5,000,295 A | * | 3/1991 | Fargier | 188/72.1 |
| 5,219,048 A | * | 6/1993 | Shaw et al. | 188/72.1 |
| 5,829,557 A | * | 11/1998 | Halasy-Wimmer et al. | 188/162 |
| 5,931,268 A | * | 8/1999 | Kingston et al. | 188/162 |
| 5,975,252 A | * | 11/1999 | Suzuki et al. | 188/73.1 |
| 6,000,507 A | * | 12/1999 | Bohm et al. | 188/158 |
| 6,158,558 A | * | 12/2000 | Bill et al. | 188/162 |
| 6,176,352 B1 | * | 1/2001 | Maron et al. | 188/1.11 E |
| 6,213,256 B1 | * | 4/2001 | Schaffer | 188/71.9 |

FOREIGN PATENT DOCUMENTS

| DE | 19650405 | * | 10/1998 | 188/157 |

* cited by examiner

Primary Examiner—Robert J. Oberleitner
Assistant Examiner—Devon Kramer
(74) Attorney, Agent, or Firm—Ronald E. Greigg

(57) ABSTRACT

An electromechanical brake for motor vehicles having a selflocking-free spindle that is electromotively moved bidirectionally in a longitudinal direction in order to press at least one brake lining against a rotating friction element in an advancing stroke and and in order to release the brake lining in a restoring stroke. The brake also has a plate-shaped coupling member between the spindle and the brake lining. The coupling member engages directly with the spindle and is supported against the brake lining so that the brake lining slides lateral to the longitudinal axis of the spindle. This largely prevents lateral forces, which interfere with the lack of friction of the spindle and can occur when the brake lining is against the friction element. The electromechanical brake is used in passenger motor vehicles.

6 Claims, 2 Drawing Sheets

FIG. 1

ELECTROMECHANICAL BRAKE FOR MOTOR VEHICLES

PRIOR ART

The invention is based on an electromechanical brake for motor vehicles.

In brakes of this kind, an automatic release of the friction lining must be assured in the event of a failure of the electric drive motor during a braking maneuver. In a disc brake of this type, which is known from WO96/03301, a push rod is therefore disposed between the spindle and the plate-shaped coupling member fastened to the brake lining in order to minimize friction-induced efficiency losses inside a selflocking-free planetary roller screw drive that contains the spindle. Since the brake lining in the caliper has a play that is necessary for the proper functioning of the disc brake, when the brake lining presses against the brake disc, a displacement of the coupling element attached to the brake lining takes place, both in the disc circumference direction and lateral to this, with the result that the push rod transmits lateral forces onto the spindle. The desired lack of friction of the planetary roller screw drive is therefore not achieved so that an automatic release of the brake lining is not always assured in the event of a malfunction.

In an electromechanical brake of this generic type for motor vehicles according to DE 196 07 295 C1, a layer-shaped or disc-shaped slide bearing is disposed as a coupling member between a spindle rod of a planetary roller threaded spindle and a brake lining, and this coupling member is intended to achieve a lateral force de-coupling between the spindle rod and the brake lining. As a result, a sliding mobility lateral to the longitudinal axis of the spindle is provided between the spindle rod and the slide bearing. Due to the relatively large area of contact between the spindle rod and the slide bearing, there is no automatic restoring of the spindle rod in the event of a drive motor failure.

U.S. Pat. No. 5,219,048 has disclosed an electromechanical brake in which brake linings with a ball/ramp mechanism can be moved in relation to a rotating friction element. The brake linings are connected to a caliper or a wear-balancing device of the brake by means of retaining brackets.

ADVANTAGES OF THE INVENTION

The brake according to the invention, has an advantage over the prior art that at the beginning of the pressing of the brake lining against the friction element, the brake lining can be displaced in relation to the coupling member while the latter maintains its orientation relative to the spindle. As a result, lateral forces on the spindle are largely prevented so that its automatic restoring is assured in the event of a drive motor failure. This automatic restoring is encouraged by the friction-reducing bearing embodiment between the spindle and the coupling member. Moreover, the brake is shorter since the spindle engages the coupling member without a push rod.

Advantageous improvements and updates of the brake possible by means of the measures taken hereinafter.

The measures taken also serve to achieve the embodiment of the coupling member and spindle as well as the friction reduction.

The improvement of the brake set forth achieves an automatic restoring of the brake lining relative to the coupling member at the end of braking.

The measures set forth has the advantage that when the brake is released, play is prevented between the brake lining, the coupling member, and the spindle.

BRIEF DESCRIPTION OF THE DRAWINGS

An exemplary embodiment of the invention is shown in a simplified form in the drawings and will be explained in detail in the subsequent description.

FIG. 1 shows a longitudinal section through an electromechanical brake and

DESCRIPTION OF THE EXEMPLARY EMBODIMENT

Figure 1:
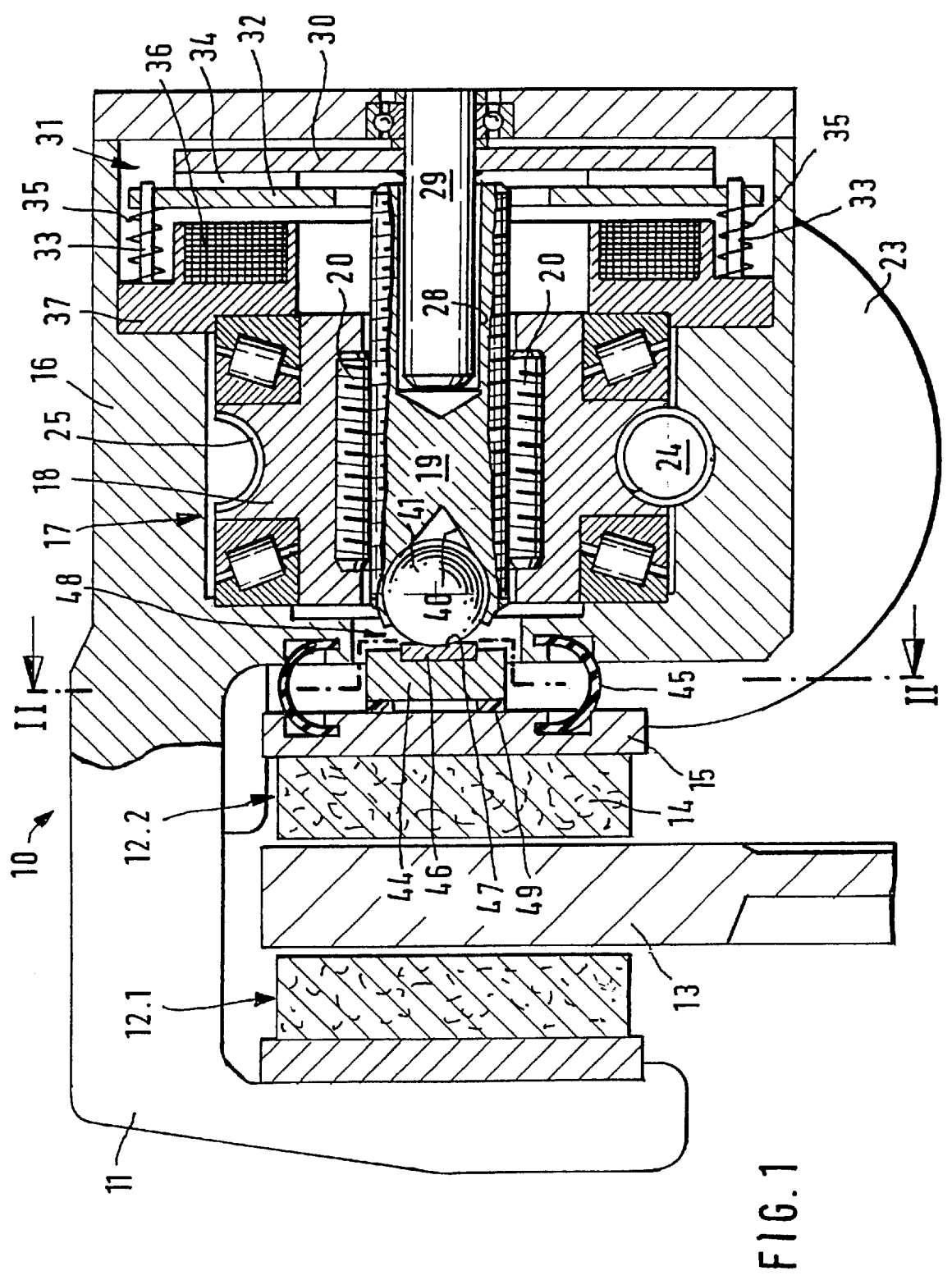
Figure 2:
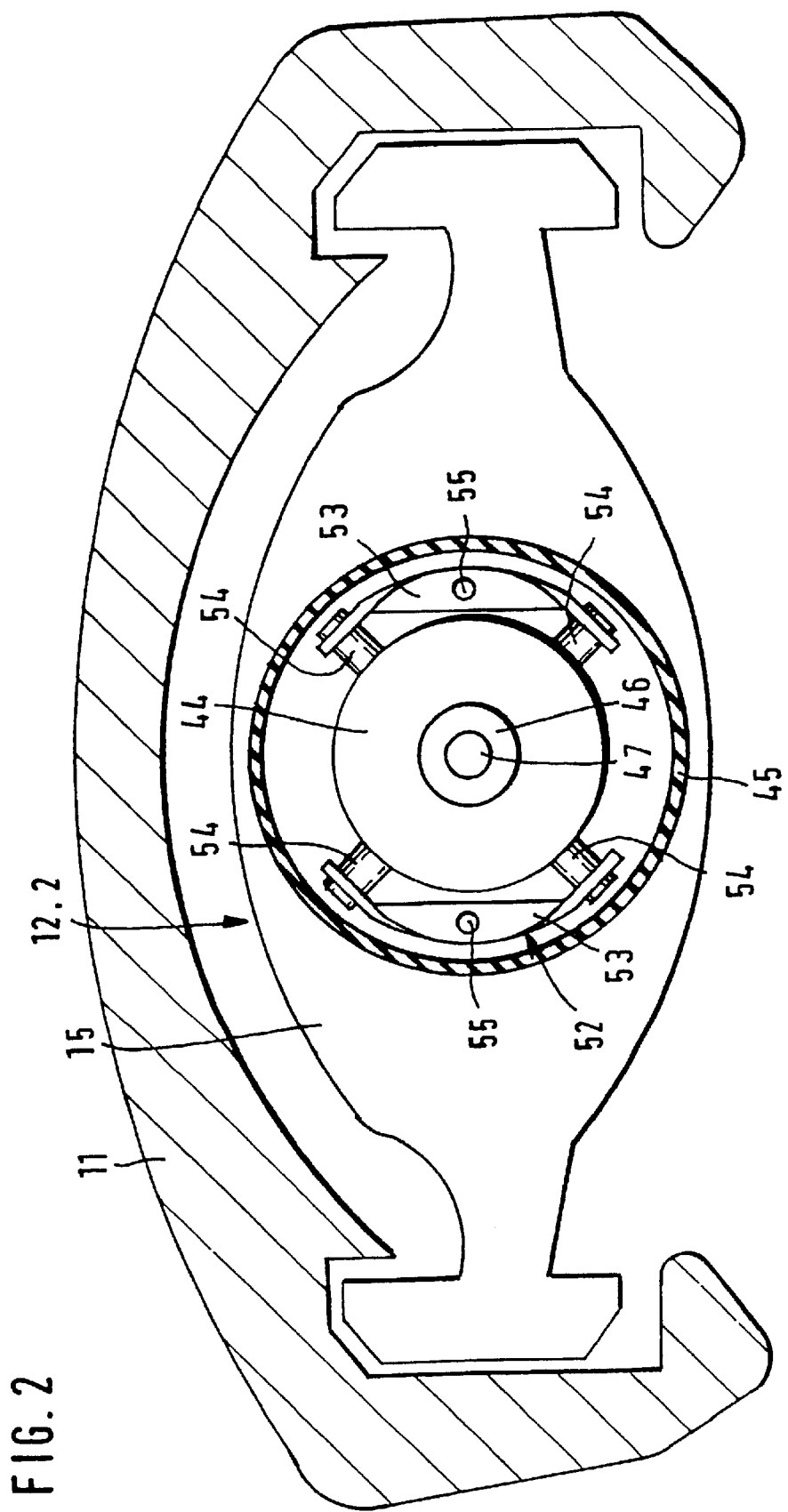
FIG. 2 shows an enlarged-scale section through the brake along the line II—II in FIG. 1.

An electromechanical brake 10 shown in FIG. 1 is embodied as a disc brake. It has a caliper 11, which accommodates a pair of friction brake linings 12.1 and 12.2 on both sides of a brake disc 13, which acts as a rotating friction element. The brake lining 12.1 is fastened to the caliper 11, the brake lining 12.2 is supported so that the brake lining can slide in the caliper. The brake linings 12.1 and 12.2 are comprised of a brake wearing layer 14 and a steel base plate 15 connected to the brake wearing layer. In order to press the brake linings 12.1 and 12.2 against the brake disc 13, a selflocking-free screw link actuator 17 in the form of a planetary roller screw drive is disposed in a housing 16 that is adjoined to the caliper 11. This planetary roller screw drive has a spindle nut 18 that is supported so that the spindle nut can rotate in the housing 16, a threaded spindle 19 that reaches through this spindle nut, and a number of threaded rollers 20 disposed between the spindle nut and the threaded spindle. The threaded rollers 20 engage with a nut thread of the spindle nut 18 and with a spindle thread of the threaded spindle 19. Through a rotating drive of the spindle nut 18, the threaded rollers 20 are driven into a revolving motion around the threaded spindle 19 like planet gears of a planetary gear. During their revolving motion, the threaded rollers 20 roll in the nut thread and against the spindle thread, i.e. during the revolving motion around the threaded spindle 19, they execute a rotating motion around their own axes. The rotating motion of the threaded rolls 20 produces a translatory motion of the threaded spindle 19 in the axial direction.

In order to drive the spindle nut 18 in a rotary fashion, the electromechanical brake 10 has an electrical drive motor 23 with a worm 24 that meshes with a circumferential gearing 25 of the spindle nut 18. In the one rotation direction of the electric motor 23, the threaded spindle 19 can be moved longitudinally in an advancing stroke for the purpose of pressing the brake linings 12.1 and 12.2 against the brake disc 13; in the other rotation direction of the motor, this threaded spindle can be restored in a restoring stroke for the purpose of releasing the brake linings from the brake disc. The threaded spindle 17 thus constitutes an actuation member of the electromechanical brake 10, which actuation member can be electromotively moved bidirectionally in the longitudinal direction.

For the proper function of the electromechanical brake 10 it is necessary to secure the threaded spindle 19 against rotation. On its end section remote from the brake lining, the spindle 19 is therefore provided with a longitudinal bore 28 that is coaxially engaged by a shaft end 29, which is supported so that the shaft end can rotate in the housing 16 but is axially immobile. A positively engaging connection, not shown, between the shaft end 29 and the threaded spindle 19 prevents a relative rotation between these two components. The shaft end 29 is connected in a rotationally fixed manner to a first clutch disc 30 of a clutch 31. A second clutch disc 32 of the clutch 31 is non-rotatably supported on pins 33 so that the second clutch disc 32 can move axially in relation to the first clutch disc. The two clutch discs 30 and 32 engage each other by means of a complementarily embodied gearing 34 through the action of compression springs 35 guided on the pins 33. In the engaged position of the clutch 31 shown in FIG. 1, the first clutch disc 30 is therefore held so that the first clutch disc cannot rotate. The clutch 31 consequently functions as a rotation prevention device for the threaded spindle 19. The clutch 31 can be electromagnetically disengaged. To this end, the second clutch disc 32 that functions as an anchoring disk can be lifted up from the first clutch disc 30 when a winding 36 in a winding carrier plate 37 affixed to the housing is supplied with current. This function of the clutch 31 is only required in the event of a malfunction which will be described later.

On its end section oriented toward the lining, the threaded spindle 19 has a bearing seat 40 for a ball 41 made of hardened steel. The ball 41, which is crimped into the spindle 19, is contained in the bearing seat 40 with a small amount of play; it can also rotate in relation to the spindle.

The threaded spindle 19 supports a plate-shaped coupling member 44, which is acted on by spring force. This action is produced by a spring-elastic sealing diaphragm 45 which, encompassing the coupling member 44 spaced apart from the coupling member in the circumference direction, engages the base plate 15 of the brake lining 12.2 on one side and engages the housing 16 of the brake 10 on the other side. This disposition results in the fact that the coupling member 44 is also supported against the brake lining 12.2. A disc-shaped bearing socket 46 made of hardened steel, with a concave, spherical dome-shaped bearing seat 47, is press-fitted into the coupling member 44 on the side oriented toward the spindle 19. In terms of its diameter and radius, the bearing seat 47 is adapted to the dimensions of the ball 41 in such a way that with a sufficient load capacity, a contact area of only a few square millimeters and therefore the low-friction rotary bearing 48 is produced between the coupling member 44 and the threaded spindle 19. A slide coating 49 that is deposited on the coupling member is provided between the coupling member 44 and the base plate 15 of the brake lining 12.2, which results in the fact that there can be a sliding motion between the coupling member and the brake lining lateral to the longitudinal axis of the spindle. In contrast to the exemplary embodiment, the coupling member 44 can also be embodied so that the coupling member is of one piece with the bearing socket 46.

In order to maintain the ability of the coupling member 44 and the brake lining 12.2 to slide in relation to one another, a spring coupling 52 with limited mobility is provided in FIG. 2. The spring coupling 52 has two spring elements 53 made of twisted leaf spring strips, which are disposed diametrically opposite one another on the circumference side of the coupling member 44, inside the sealing diaphragm 45. At the ends, the spring elements 53 are attached to pins 54, which are disposed extending radially, at 90° intervals around the circumference of the coupling member 44. In their center section, the spring elements 53 are connected to pins 55 that are anchored in the base plate 15 of the brake lining 12.2. The spring coupling 52 permits a movement between the brake lining 12.2 and coupling member 44 in all directions lateral to the longitudinal axis of the threaded spindle 19. In contrast to the exemplary embodiment, the spring elements 53 can have a different form. However, it is of crucial significance that when there is a deflection of the spring elements 53, relatively low restoring forces come into play between the coupling member 44 and the brake lining 12.2.

During operation of the electromechanical brake 10, the spring coupling 52 functions as follows: through the supply of current to the drive motor 23, in the advancing stroke, the two brake linings 12.1 and 12.2 are brought into contact with the brake disc 13 through the longitudinal motion of the threaded spindle 19. In its guidance on the caliper 11, the brake lining 12.2 necessarily has play which, upon engagement of the brake lining against the brake disc 13, depending on the rotation direction of the disc, produces a displacement of the brake lining predominantly in the circumference direction of the brake disc. The friction-reducing slide coating 49 on the coupling member 44 prevents the coupling member from following the movement of the brake lining 12.2. The bearing seat 47 on the coupling member 44 thus remains in a coaxial orientation in relation to the threaded spindle 19. The displacement of the brake lining 12.2 in the circumference direction of the brake disc 19 therefore does not result in lateral forces of any consequence on the threaded spindle 19. Therefore only the slight restoring forces of the spring elements 53 act on the coupling member 44 and only have a slight effect on the low-friction guidance of the threaded spindle 19 in the screw link actuator 17.

If the spindle 19 is restored during the restoring stroke when the brake 10 is released, the spring-elastic sealing diaphragm 45 produces the play-free support of the coupling member 44 against the spindle 19 and the brake lining 12.2 against the coupling member 44. When the brake lining 12.2 lifts up from the brake disc 13, the spring elements 53 of the spring coupling 52 ensure that the brake lining assumes its original position.

If the electric drive motor 23 fails during a breaking maneuver, then the brake control unit supplies the clutch 31 with current and the second clutch disc 32 is lifted up from the first clutch disc 30. The axial force on the threaded spindle 19, which is essentially produced by the elastic deformation of the caliper 11 and the slide coating 14 of the brake linings 12.1 and 12.2, ensures that this threaded spindle is set into rotation and executes a restoring stroke which results in an essentially total reduction of the brake force against the brake disc 13. In this connection, the automatic restoring of the threaded spindle 19 is encouraged by virtue of the fact that due to the capacity of the coupling member 44 to slide in relation to the brake lining 12.2, at the very most, slight lateral forces interfere with the lack of friction of the threaded spindle 19. The low-friction embodiment of the rotary bearing 48 is also required for the automatic restoring of the threaded spindle 19. However, even if the rotary bearing 48 malfunctions, there is an automatic restoring of the spindle 19 due to the rotary support of the ball 41 in the spindle 19.

The foregoing relates to a preferred exemplary embodiments of the invention, it being understood that other variants and embodiments thereof are possible within the spirit and scope of the invention, the latter being defined by the appended claims.

What is claimed is:

1. An electromechanical brake (10) for motor vehicles, comprising a selflocking-free spindle (19) that is electromotively moved bidirectionally in a longitudinal direction in order to press at least one brake lining (12.2) against a rotating friction element (13) in an advancing stroke and in order to release the brake lining (12.2) in a restoring stroke, a coupling member (44) disposed between the spindle (19) and the brake lining (12.2), the coupling member (44) engages the spindle (19) and is supported against the brake lining (12.2) so that the brake lining slides lateral to the longitudinal axis of the spindle, the coupling member (44) is embodied as plate-shaped and that toward the lining, the coupling member (44) is provided with a slide coating (49)

and toward the spindle, the coupling member is provided with a bearing seat (47) for the spindle (19), which is embodied as ball-shaped on an end toward said bearing seat.

2. The brake according to claim 1, in which a hardened steel bearing socket (46), which includes the bearing seat (47), is press-fitted into the coupling member (44) on a side oriented toward the spindle.

3. The brake according to claim 1, in which a hardened steel ball (41) is contained so that it can rotate in the end of the spindle (19).

4. The brake according to claim 1, in which the coupling member (44) is fastened to the brake lining (12.2) by means of spring elements (53).

5. The brake according to claim 2, in which the brake lining (12.2) and the coupling member (44) are supported against each other in an axially play-free manner by means of a spring-elastic sealing diaphragm (45) which encompasses the coupling member (44) with spring elements (53), and the bearing socket (46) of the coupling member (44) is supported in a play-free manner against the spindle (19).

6. The brake according to claim 4, in which the brake lining (12.2) and the coupling member (44) are supported against each other in an axially play-free manner by means of a spring-elastic sealing diaphragm (45) which encompasses the coupling member (44) with spring elements (53), and a bearing socket (46) of the coupling member (44) is supported in a play-free manner against the spindle (19).

* * * * *